May 22, 1962 H. O. WOLFF 3,035,319
CLAMP DEVICES
Filed Sept. 15, 1959
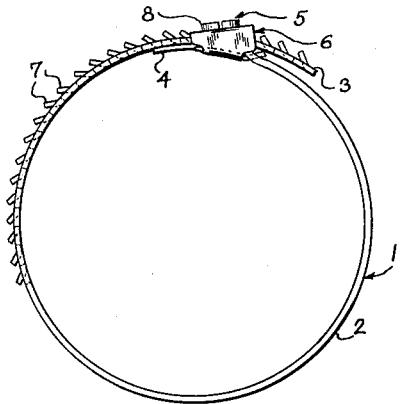
Fig. 1
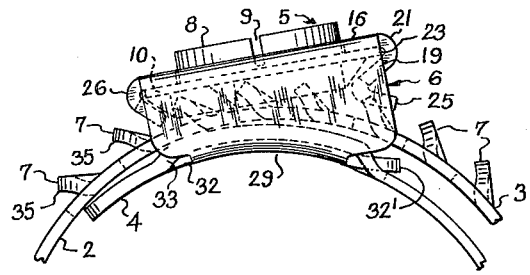
Fig. 2
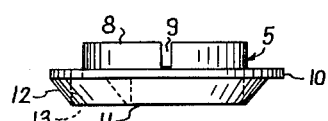
Fig. 6
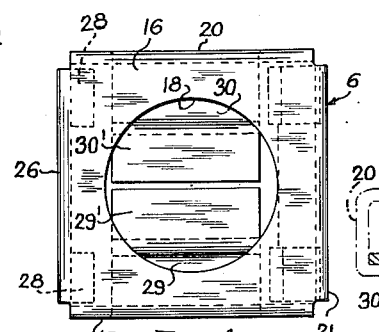
Fig. 4
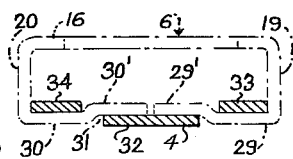
Fig. 7
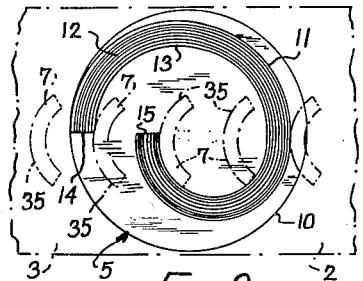
Fig. 8
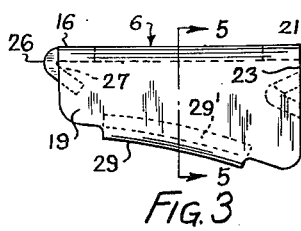
Fig. 3
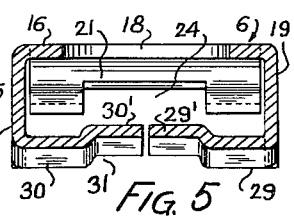
Fig. 5
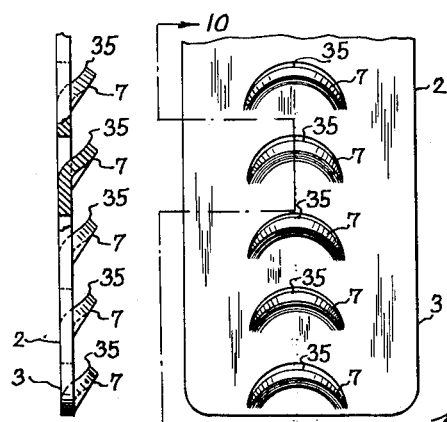
Fig. 10   Fig. 9
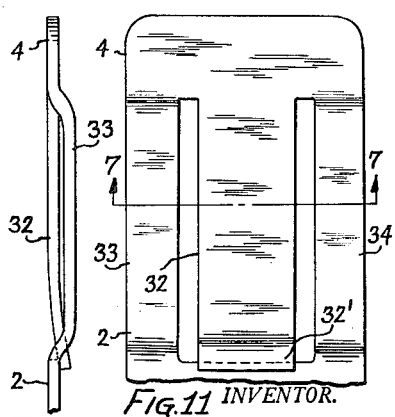
Fig. 11
Fig. 12
INVENTOR.
HARRY O. WOLFF
BY Hudson, Boughton,
Williams, David & Hoffmann
ATTORNEYS United States Patent Office 3,035,319
Patented May 22, 1962

3,035,319
CLAMP DEVICES
Harry O. Wolff, 1546 Cardova Ave., Lakewood, Ohio
Filed Sept. 15, 1959, Ser. No. 840,160
10 Claims. (Cl. 24—19)

This invention relates to clamp devices and has particular relation to a clamp device including a ring-shaped member which may be contracted and expanded about an object to be clamped.

According to the present invention, a clamp device is provided wherein a contractible ring-shaped member is provided with a pair of ends arranged for overlapping relation. An operating member is provided for attachment to one of the ends to effect contraction and expansion of the ring-shaped member in response to adjustment of the operating member. The operating member is preferably positioned and configured to engage a plurality of teeth provided adjacent the other end of the ring-shaped member to effect relative displacement of the ends of the ring in response to adjustment of the operating member.

In a preferred embodiment of the invention the operating member is mounted at one end of the ring-shaped member for rotation about an axis. The operating member includes a spiral camming surface which is spiraled about the axis of rotation of the operating member to successively engage adjacent ones of a plurality of teeth spaced circumferentially of the ring-shaped member adjacent the other end thereof. The operating member is conveniently detachably mounted to one end of the ring-shaped member by means of a suitable housing through which the teeth-containing end of the ring-shaped member extends.

In the present invention the operating member is conveniently rotated by a suitable tool such as a screw driver from a readily accessible position. The axis of rotation of the operating member is arranged so that such axis intersects the overlapped ends of the ring-shaped member at an angle thereto which deviates somewhat from an angle of 90° and passes to one side of the center of the ring.

The camming surface of the operating member is configured so that the camming surface is in engagement with an advanced one of the teeth of the ring-shaped member during initial contact of the adjacent tooth whereby accidental expansion of the ring is prevented during a clamping operation. In a preferred embodiment of the invention the spiral camming surface is generated about the central longitudinal axis of the operating member through an angle of the order of 360°, or one complete revolution. With this arrangement a new tooth is presented to the camming surface for each complete revolution of the operating member.

The invention further contemplates a unique arrangement of the teeth which assures an efficient clamping action without the possibility of damage to the teeth. For this purpose the teeth are struckout of the material of the ring-shaped member so that the teeth are joined to the ring-shaped member along curved lines. The teeth and camming surface are arranged so that when the camming surface is rotated to effect clamping of the ring-shaped member, the force exerted by the camming surface on the teeth tends to increase the space between the ends of the teeth and the ring-shaped member. In the present invention the teeth are spaced circumferentially about the ring so as to be aligned along an axis which is offset slightly to one side of the longitudinal central axis of the ring-shaped member.

It is therefore an object of the invention to provide an improved clamp device.

It is another object of the invention to provide an improved clamp device including a contractible ring-shaped member having a pair of overlapping ends which are displaced relative to one another by rotation of an operating member carried by one of the ends for expanding and contracting the ring-shaped member.

It is a further object of the invention to provide a device as defined in the preceding object wherein the operating member is rotatable about an axis which intersects the overlapped ends at an angle different than 90° and passes to one side of the center of the ring.

It is still another object of the invention to provide a device as defined in the next preceding object wherein the operating member includes a spiral camming surface which is generated about the central longitudinal axis of the operating member.

It is a still further object of the invention to provide a clamp device including a ring-shaped member having overlapped ends with a plurality of circumferentially spaced teeth struck up therefrom adjacent one end with an operating member attached to the other end for rotation about an axis which intersects the overlapped ends to effect contraction and expansion of the ring.

It is another object of the invention to provide a clamp device including a ring-shaped member having a plurality of teeth struck up therefrom so that an operating member which engages the teeth tends to increase the spacing between the ends of the teeth and the ring-shaped member when the ring-shaped member is contracted.

It is another object of the invention to provide a clamp device which is of sturdy construction and which may be manufactured at a minimum cost to provide a very effective clamping action which may be effected at a readily accessible area.

Other objects will become apparent from the following description taken in conjunction with the accompanying drawings, in which—

FIG. 1 is a view in side elevation of a clamp device embodying the teachings of the present invention;

FIG. 2 is an enlarged view of a portion of the device of FIG. 1 showing the operating member in association with teeth of the ring-shaped member;

FIG. 3 is a view in side elevation of a housing for mounting the operating member on one end of the ring-shaped member;

FIG. 4 is a view in top plan of the housing of FIG. 3;

FIG. 5 is a view in section taken along the line 5—5 of FIG. 3;

FIG. 6 is a view in side elevation of the operating member;

FIG. 7 is a view in section taken along the line 7—7 of FIG. 11 with the housing shown in broken lines;

FIG. 8 is a view in bottom plan of the member of FIG. 6, showing the camming surface thereof in association with teeth illustrated in broken lines;

FIG. 9 is a view in top plan of one end of the ring-shaped member showing a plurality of the teeth;

FIG. 10 is a view taken along the line 10—10 of FIG. 9 with parts shown in section;

FIG. 11 is a view in top plan of the other end portion of the ring-shaped member showing a tab struck out therefrom for mounting the housing of FIG. 3; and FIG.12 is a view in side elevation of the end portion shown in FIG. 11.

Referring now to the drawings, there is illustrated in FIG. 1 a clamp device represented generally by the numeral 1 constructed in accordance with the teachings of the present invention. The clamp device has many and varied uses and may be employed in any installation wherein it is desired to effect the adjustable clamping of an object. For example, the clamp device may be utilized as a hose clamp.

As illustrated in FIG. 1, the clamp device 1 includes a ring-shaped member 2 having a pair of spaced ends 3 and 4. The member 2 may be formed of any suitable material to be of contractible construction so as to permit the relative movement between the ends 3 and 4 about the axis of the ring. The ring-shaped member 2 is proportioned so that the ends 3 and 4 may be positioned in overlapping relation in a radial direction as veiwed in FIG. 1. As is understood, objects to be clamped are positioned within the opening defined by the member 2 and are clamped and unclamped by effecting relative movement between the ends 3 and 4 about the axis of the ring to vary the diameter of the ring.

In order to effect relative movement between the ends 3 and 4 of the member 2 the clamp device includes a operating member 5 which is to be attached to one of the ends of the member 2 for operatively engaging the other end of the member 2. The member 5 is mounted for adjustment and is effective when adjusted to cause displacement of the ends 3 and 4 relative to each other about the axis of the ring. In the present invention the operating member 5 is detachably secured to the end 4 which is positioned nearer to the center of the ring than the end 3 of the member 2. The member 5 is adapted to operatively engage the end 3 so that upon adjustment of the member 5 the end 3 will be moved about the axis of the ring relative to the end 4 in either direction to effect expansion and contraction of the ring. Details of construction of the member 5 will appear hereinafter.

In order to mount the member 5 to the end 4 of the member 2 the present invention provides a suitable housing 6 for rotatably supporting the member 5. The housing 6 is arranged so as to be attached to the end 4 of the member 2 in a manner permitting ready assembly and disassembly of the housing with respect to the member 2.

The operating member 5 is adapted to operatively engage a plurality of teeth 7 which are preferably integrally formed on the ring-shaped member 2. As illustrated in FIGS. 1 and 9, the teeth 7 are spaced circumferentially about a portion of the member 2 adjacent the end 3 thereof. As will presently appear, the member 5 includes a portion which engages the teeth 7 to effect movement of the end 3 relative to the end 4 in response to rotation of the member 5.

In the preferred embodiment of the invention illustrated, the operating member 5 includes a head portion 8 of circular configuration having a slot 9 therein adapted to receive a suitable tool such as a conventional screw driver to effect rotation of the member 5. As best shown in FIGS. 6 and 8, the member 5 also includes a base 10 preferably integrally attached to the bottom of the head 8 and which is of circular configuration to have a larger radius than the radius of the circular head 8.

In the present invention the member 5 includes a camming surface which is generated about the central longitudinal axis or the axis of rotation of the member 5 to engage surfaces of the teeth 7. For this purpose the member 5 includes a projection 11 which extends downwardly from the lower surface of the base 10, as viewed in FIG. 6. This projection is formed in part by a surface 12 which slopes inwardly and downwardly from the lower surface of the base 10 toward the center thereof, as viewed in FIG. 6.

It is observed that the radial spacing of the surface 12 from the periphery of the base 10 increases in the clockwise direction as viewed in FIG. 8. The projection 11 is formed also by a surface 13 which extends transversely of the lower surface of the base 10 between the lower surface of base 10 and the surface 12. The surface 13 may be referred to as a camming surface and is adapted to engage the teeth 7. In the present invention the surface 13 is in the form of a spiral which is generated about the central longitudinal axis of the member 5 to have a radius which decreases in a clockwise direction, as viewed in FIG. 8.

As best shown in FIG. 8, the projection 11 includes a pair of terminal end faces 14 and 15 which lie in the central longitudinal plane of the operating member 5. It is noted further that the extreme end portions of the surface 13 are intersected by such central plane and are spaced by an amount equal to the spacing between the left-hand surfaces of the teeth as viewed in FIG. 8. The camming surface 13 is generated about the central longitudinal axis of the member 5 through an angle of the order of 360° or one complete revolution. As a result of this construction a separate new tooth will be presented to the portion of the camming surface 13 which is adjacent the face 14 for each complete revolution of the member 5 about its longitudinal axis. The arrangement is such that the portion of the surface 13 adjacent the end face 15 is in engagement with one of the teeth 7 during the time that the portion of the surface 13 adjacent the end face 14 is initiating contact with the adjacent new tooth so that the end 3 cannot be accidentally expanded relative to the end 4 during a clamping operation.

In order to mount the member 5 to the member 2 the invention provides a housing 6, details of which are illustrated in FIGS. 3, 4, and 5. As there shown, the housing is in finished form and includes a body which may be formed of a suitable metallic material. The body is constructed to include deformable parts which may be readily deformed to secure the member 5 within the housing, as will appear hereinafter. The body of the housing includes a flat central portion 16 having a circular central opening 18 for receiving the head 8 of the member 5, as will presently appear. At opposing sides of the portion 16 there is provided a pair of flanges 19 and 20 which extend downwardly from the portion 16 and transversely thereto, as viewed in FIGS. 3 and 5.

A deformable flange 21 having substantially the configuration of the number "2" in the finished form as viewed in FIG. 3 is provided at the right hand side of the portion 16 between the flanges 19 and 20. The flange 21 extends downwardly, inwardly and then outwardly in the finished form, from the portion 16 as best shown in FIG. 3, so that the base 10 of the member 5 may be held within the V-shaped pocket 23 defined by the flange 21 as shown in FIG. 2. The flange 21 includes a slot 24 providing spaced legs 25 between which the teeth 7 pass when the end 3 is moved relative to the end 4. An additional flange 26 defining a V-shaped pocket 27 in the finished form is provided at the left hand side of the portion 16 as viewed in FIG. 3. This flange is also slotted to provide spaced legs 28 between which the teeth 7 pass. The base 10 is also located in the pocket 27.

The housing includes further a pair of deformable parts 29 and 30 integrally connected respectively to the flanges 19 and 20. The parts 29 and 30 extend toward each other in the finished form, but are spaced by a small amount, as clearly shown in FIGS. 4 and 5. To permit attachment of the member 5 to the housing the parts 29 and 30 are initially formed to extend downwardly from the flanges 19 and 20 and are subsequently deformed upwardly to their illustrated positions after the member 5 is positioned within the housing. As best shown in FIG. 5, the parts 29 and 30 include respectively portions 29' and 30' which are displaced upwardly to define a recess 31 which receives a tab 32 which is struck out from the material of the member 2 at the end 4 thereof.

As shown in FIG. 12, the tab 32 is in the plane of the end 4 of the member 2 except for its terminal part 32' which is deformed upwardly toward the end 3 to engage the upper surface of the end 4 when the ends 3 and 4 are operatively positioned in overlapping relation, as illustrated in FIGS. 1 and 2. In order to attach the assembled unit consisting of the member 5 and the housing 6 to the end 4 of the ring-shaped member 2 the tab 32 is deformed so that the part 32' underlies the lower surface of the end 4. The end 4 is then passed through the housing 6 and the parts positioned so that the displaced portions 29' and 30' of the bridge parts 29 and 30 are located above the tab 32 with the tab 32 within the recess 31, and so that the sides 33 and 34 of the end 4 are located respectively above the parts 29 and 30, as viewed in FIG. 7. The part 32' is then positioned as shown in FIG. 2 on the upper surface of the end 4. With this arrangement the housing 6 is firmly attached to the end 4 of the member 2 but may be readily disassembled with respect to the end 4.

In order to attach the operating member 5 to the housing 6 the housing 6 is initially formed with the parts 29 and 30 extending downwardly from the flanges 19 and 20 and with the flanges 21 and 26 projecting horizontally as viewed in FIG. 3. The member 5 is then positioned with respect to the housing 6 so that the head 8 of the member 5 extends through the opening 18 of the portion 16 and so that the base 10 of the member 5 is beneath the portion 16 in engagement with the under surface thereof as viewed in FIG. 2. The flanges 21 and 26 are then deformed to assume the positions illustrated in FIGS. 2 and 3 so that the base 10 is located within the pockets 23 and 27 defined by the flanges 21 and 26. The parts 29 and 30 may then be deformed upwardly to assume their illustrated positions to provide the completed unit. The arrangement is such that the member 5 is freely rotatable relative to the housing but cannot become accidentally detached therefrom. When the member 5 is mounted within the housing in the manner described the assembled unit, including the member 5 and the housing 6, is then secured to the end 4 in the manner previously described.

It is noted with reference to FIG. 2 that the housing 6 is arranged so that the axis of rotation of the member 5 does not extend radially of the ring, but extends along an axis which intersects the ends 3 and 4 and passes to one side of the center of the ring. This arrangement is provided so that the teeth 7 which pass to the right of the central longitudinal axis of the member 5 as viewed in FIG. 2 will not become jammed against the camming surface 13 but will be located beneath the surface 13. This desirable construction is provided by forming the parts 29 and 30 so these parts are inclined with respect to the plane of the base 10 as viewed in FIG. 2. The angle of inclination between the parts 29 and 30 and the base 10 may be of the order of twelve degrees. Another way of viewing this construction is that the plane which includes the camming surface 13 is tangential to the member 2 approximately at the point where the surface 13 engages a new tooth.

When the member 5 and housing 6 are secured to the end 4, the end 3 may be positioned within the housing and the member 5 adjusted so that one of the teeth 7 is in a position wherein it occupies the space between the terminals of the projection 11 beneath the base 10. It is noticed with reference to FIG. 9, that the teeth 7 each includes a curved edge 35 at the end thereof which is adapted to engage the camming surface 13 of the projection 11. In order to provide teeth of rigid construction the invention provides that the teeth are joined to the material of the member 2 along lines which are curved rather than linear. As is shown in the drawings, each of the teeth 7 is in the form of an upstanding arcuate segment which leans away from the end of the band adjacent which the teeth are disposed and which is concave when viewed from the last-mentioned end, and which has side edges which curve from the side of the band from which the tooth extends and which curve to merge with the upper edge of the tooth to provide one continuous curved edge 35 rising from the band and which is engaged by the spiral cam. It is also observed with reference to FIG. 9 that the teeth 7 are aligned along an axis passing through the centers of the teeth which is slightly offset to one side of the central longitudinal axis of the member 2. This arrangement assures that the portion of the surface 13 adjacent the end face 15 will not become disengaged from a tooth until the portion of the surface 13 adjacent the end face 14 is in firm contact with the adjacent new tooth.

In operation, if it is desired to clamp the member 2 about an object, the operating member 5 is rotated in a counterclockwise direction, as viewed in FIG. 8, or in a clockwise direction as viewed from the top of FIG. 2. If the member 5 is initially positioned with respect to the teeth 7 with the surface 13 engaging the second tooth from the left, as shown in FIG. 8, such rotation will effect displacement of the teeth 7 and the end 3 toward the right as viewed in FIG. 8, inasmuch as the surface 13 is presenting its decreasing radius to the engaged tooth during such rotation. Rotation of the member 5 in the clamping direction through a complete revolution will result in the displacement of the second tooth from the left of FIG. 8 from its illustrated position to the position occupied by the center tooth of FIG. 8, and as a result the end 3 will be moved relative to the end 4 in a clockwise direction as viewed in FIG. 1.

It is noted that when the portion of the surface 13 adjacent the end face 14 is initiating engagement with the second tooth from the left as viewed in FIG. 8, the portion of the surface 13 adjacent the end face 15 will still be in contact with the center tooth 7. This arrangement assures against accidental expansion of the ring-shaped member 2 during rotation of the member 5 in the clamping direction. The portion of the surface 13 adjacent the end face 15 will not become disengaged from the center tooth until the portion of the surface 13 adjacent the end face 14 engages the entire edge 35 of the second tooth from the left. It is noted that during the clamping action a component of the force exerted by the surface 13 on the edge 35 tends to increase the spacing between the edge 35 and the member 2. This component is small, however, due to the inclination of the teeth and does not effect such increase in spacing. The arrangement of the teeth assures against their deformation under operating conditions.

Any desired amount of contraction of the member 2 may be realized by rotating the member 5. As an example, if the member 5 is rotated in the counterclockwise clamping direction as viewed in FIG. 8 through five complete revolutions, five successive teeth will have been engaged by the surface 13 to advance the end 3 in the clockwise direction as viewed in FIG. 1 by an amount substantially equal to five times the distance between any two adjacent teeth.

The sloping arrangement of the surface 12 and its increasing spacing from the periphery of the base 10 permit continuous movement of the teeth 7 toward the right as viewed in FIG. 8 without the possibility of the teeth striking the surface 12 and jamming the member 5 against rotation. As the member 5 is rotated in the counterclockwise clamping direction as viewed in FIG. 8, the surface 12 is in effect moved to the right with the left hand tooth of FIG. 8 so that the spacing between the surface 12 and the left hand tooth is maintained.

In order to expand the previously clamped member 2 it is only necessary to effect rotation of the member 5 in the clockwise direction as viewed in FIG. 8. This has the effect of presenting an increasing radius of the camming surface 13 to the center tooth so as to allow displacement of the center tooth toward the left, as viewed in FIG. 7. Such displacement will be effected by reason of the resilient construction of the member 2 and the previous contracted condition of the member 2.

Although the invention has been described with reference to certain specific embodiments thereof, numerous modifications are possible and it is desired to cover all modifications falling within the spirit and scope of the appended claims.

Having thus described my invention, I claim:

1. A clamp device including a metallic band defining a ring and having a plurality of teeth evenly spaced along the length of the band at one end portion thereof and an operating member rotatably supported by the other end portion of the band and comprising a flat spiral cam adapted on rotation to successively engage successive teeth to move said teeth in one direction to contract said ring, said teeth engaging said cam on the inside of the spiral, each of said teeth being upstruck to extend from one side of said band with the outer upstruck edge being in the form of a curve extending transversely of said band and rising from said band to present an edge to said cam which is convexly curved when the tooth is viewed in top plan, said teeth each having a side facing in said one direction and joining said one side of said band along a concave line of curvature with the tooth leaning bodily from said concave line in a direction opposite to said one direction to engage said cam.

2. A clamp device including a metallic band defining a ring and having a plurality of teeth evenly spaced along the length of the band at one end portion thereof and an operating member rotatably supported by the other end portion of the band and comprising a flat spiral cam adapted on rotation to successively engage successive teeth to move said teeth in one direction to contract said ring, said teeth engaging said cam on the inside of said spiral, each of said teeth being upstruck to extend from one side of said band with the upstruck edge being in the form of a curve extending transversely of said band and rising from said band and presenting an edge to said cam which is convexly curved when the tooth is viewed in top plan, said teeth each having a side facing in said one direction and joining said one side of said band along a concave line of curvature with the tooth leaning bodily from said concave line in a direction opposite to said one direction, said convex edge and concave line having substantially the same chordal line.

3. A clamp device including a metallic band defining a ring and having a plurality of teeth evenly spaced along the length of the band at one end portion thereof and an operating member rotatably supported at the other end portion of the band and comprising a flat spiral cam adapted on rotation to successively engage successive teeth to move said teeth in one direction to contract said ring, said teeth engaging said cam on the inside of said spiral, each of said teeth being upstruck to extend from one side of said band with the upstruck edge being in the form of a curve extending transversely of said band and rising from said band and presenting an edge to said cam which is convexly curved when the tooth is viewed in top plan, said teeth each having a side facing in said one direction and joining said one side of said band along a concave line of curvature with the tooth leaning bodily from said concave line in a direction opposite to said one direction, said convex edge and concave line having substantially the same chordal line and said teeth each having a concave portion adjacent said one side of the band when viewed from said one direction and a deflected outer edge portion to present said convex edge of the tooth to said cam.

4. In a clamp device, a contractible ring-shaped member having a pair of ends proportioned to allow overlap of the ends in a radial direction, a plurality of aligned upstanding teeth spaced circumferentially of the ring-shaped member adjacent the outer end of said ends, a housing secured to the inner one of said ends to slidably receive said outer end, and an operating member adapted to be attached to said housing externally of the ring-shaped member for rotation about a first axis extending substantially transverse to the axis of the ring-shaped member, said first axis intersecting the overlapped ends to pass to one side of the center of the ring-shaped member, said operating member having a base with a projection extending therefrom toward the outer end of the ends, said projection including a spiral camming surface generated about the first axis to engage said teeth when said outer end is received in the housing, said camming surface being effective in response to rotation of the operating member to present a progressively changing radius to an engaged tooth for displacing an engaged tooth toward the first axis relative to said inner end, said projection including additionally a sloping surface on the side thereof away from the camming surface which slopes from the base inwardly from the first axis and the camming surface.

5. In a clamp device, a contractible ring-shaped member having a pair of ends proportioned to allow overlap of the ends in a radial direction, a plurality of aligned upstanding teeth spaced circumferentially of the ring-shaped member adjacent the outer end of said ends, a housing adapted to be scured to the inner one of said ends to slidably receive said outer end, and an operating member adapted to be attached to said housing externally of the ring-shaped member for rotation about a first axis extending substantially transverse to the axis of the ring-shaped member, said first axis intersecting the overlapped ends to pass to one side of the center of the ring-shaped member, said operating member having a base with a projection extending therefrom toward the outer end of the ends, said projection including a spiral camming surface generated about the first axis to engage said teeth when said outer end is received in the housing, said camming surface being effective in response to rotation of the operating member to present a progressively changing radius to an engaged tooth for displacing an engaged tooth toward the first axis relative to said inner end, said projection including additionally a sloping surface on the side thereof away from the camming surface which slopes from the base inwardly toward the first axis and the camming surface, said housing being detachably connected to said band and having an underside formed of sheet metal with a central longitudinal portion thereof deflected inwardly of the housing to provide inwardly facing channels along each side of the housing, said band at said inner end having spaced longitudinal side portions deflected from the plane of the band toward the outer overlapping end portion and received in said channels and an elongated slot between said side portions and a tongue extending from and joined to the band at said one end of said slot and being received in said deflected portion of said housing and overlapping the other end of said slot on the side thereof facing said overlapping outer end portion.

6. A clamp including a metallic band provided at one end with a plurality of teeth evenly spaced in the length of the band, a cage formed on the opposite end of the band and in use overlying said teeth, a cam disk rotatably supported within said cage with its axis directed in use generally upstandingly relative to the toothed end of the band, and said cam disk having radially inner and outer rim portions engageable with successive teeth and spaced from one another by the spacing between teeth, and a curved intermediate rim portion smoothly joining said inner and outer rim portions, said cam disk including a flange at its outer edge portion, said flange being adapted to engage said teeth.

7. A clamp as in claim 6 including a circular washer integral with the cam disk, outstanding at least to the greatest radius thereof, and contacting the inner surface of the apertured outer wall of the cage to close its aperture, and bearing at its edge upon the cage.

8. A clamp including a metallic band provided at one end with a plurality of teeth evenly spaced in the length of the band, a cage formed on the opposite end of the band and in use overlying said teeth, a cam disk rotatably supported within said cage with its axis directed in use generally upstandingly relative to the toothed end of the band, and said cam disk having radially inner and outer rim portions engageable with successive teeth and spaced from one another by the spacing between teeth, and a curved intermediate rim portion smoothly joining said inner and outer rim portions, the cam disk having means centrally disposed for engagement by a rotating tool, the outer wall of the cage being apertured for access of such a tool to the tool-engaged means of the disk.

9. In a clamp device, a contractible ring-shaped member having a pair of ends proportioned to allow overlap of the ends in a radial direction, a plurality of aligned upstanding teeth spaced circumferentially of the ring-shaped member adjacent the outer one of said ends, a housing adapted to be detachably secured to the inner one of said ends to slidably receive said outer end, and an operating member adapted to be attached to said housing externally of the ring-shaped member for rotation about a first axis extending substantially transverse to the axis of the ring-shaped member, said first axis intersecting the overlapped ends to pass to one side of the center of the ring-shaped member, said operating member having a base with a projection extending therefrom toward the outer one of the ends, said projection including a camming surface generated about the first axis to engage said teeth when said outer end is received in the housing, said camming surface being effective in response to rotation of the operating member to present a decreasing radius to an engaged tooth for displacing an engaged tooth toward the first axis relative to said inner end, said projection including additionally a sloping surface which slopes from the base inwardly toward the first axis to intersect the camming surface.

10. In a clamp device, a contractible ring-shaped member having a pair of ends proportioned to allow overlap of the ends in a radial direction, a plurality of aligned upstanding teeth spaced circumferentially of the ring-shaped member adjacent the outer one of said ends, a housing adapted to be detachably secured to the inner one of said ends to slidably receive said outer end, and an operating member adapted to be attached to said housing externally of the ring-shaped member for rotation about a first axis extending substantially transverse to the axis of the ring-shaped member, said first axis intersecting the overlapped ends to pass to one side of the center of the ring-shaped member, said operating member having a base with a projection extending therefrom toward the outer one of the ends, said projection including a camming surface generated about the first axis to engage said teeth when said outer end is received in the housing, said camming surface being effective in response to rotation of the operating member to present a decreasing radius to an engaged tooth for displacing an engaged tooth toward the first axis relative to said inner end, said projection including additionally a sloping surface which slopes from the base inwardly toward the first axis to intersect the camming surface, each of said teeth being struck out of the material of the ring-shaped member to be joined thereto along a curved line, the center line of alignment of said teeth being offset to one side of the central longitudinal axis of the ring-shaped member.

References Cited in the file of this patent

UNITED STATES PATENTS

| | | |
|---|---|---|
| 1,584,935 | Hathorn | May 18, 1926 |
| 2,689,998 | O'Shei | Sept. 28, 1954 |
| 2,907,086 | Ord | Oct. 6, 1959 |
| 2,944,314 | Black | July 12, 1960 |

FOREIGN PATENTS

| | | |
|---|---|---|
| 924,399 | France | Mar. 10, 1947 |
| 199,702 | Germany | June 23, 1908 |
| 455,907 | Great Britain | Oct. 29, 1936 |
| 78,402 | Norway | Apr. 9, 1951 |